No. 646,302. Patented Mar. 27, 1900.
A. P. MORROW.
BACK PEDALING BRAKE.
(Application filed Mar. 30, 1899.)
(No Model.)

Witnesses
T. S. Mockabee
H. Joseph Doyle

Inventor
Alexander P. Morrow
by Jas. L. Skidmore
his Atty.

UNITED STATES PATENT OFFICE.

ALEXANDER P. MORROW, OF ELMIRA, NEW YORK, ASSIGNOR OF ONE-HALF TO H. H. FULTON, OF SAME PLACE.

BACK-PEDALING BRAKE.

SPECIFICATION forming part of Letters Patent No. 646,302, dated March 27, 1900.

Application filed March 30, 1899. Serial No. 711,135. (No model.)

*To all whom it may concern:*

Be it known that I, ALEXANDER P. MORROW, a citizen of the United States, residing at Elmira, in the county of Chemung and State of New York, have invented certain new and useful Improvements in Hub Coasting and Braking Mechanisms for Bicycles and Like Vehicles; and I do declare the following to be a full, clear, and exact description of the invention, such as will enable others skilled in the art to which it appertains to make and use the same.

My invention has relation to improvements in combined hub coasting and brake mechanisms for bicycles and other like vehicles; and the object is to provide an improved and simplified mechanism mounted on the hub of a vehicle of the kind or style involved whereby the wheel to which the invention is applied may be free to revolve independently of the power which ordinarily and positively propels it and may also on the reversal of the power be made to brake the wheel to stop the progress of the wheel and vehicle.

The invention therefore consists in the novel construction and combination of parts involved in the mechanism, as will be hereinafter fully described and set forth and then particularly pointed out and claimed.

The invention is fully and clearly illustrated in the accompanying drawings, to be taken as a part thereof, and wherein—

Figure 1:
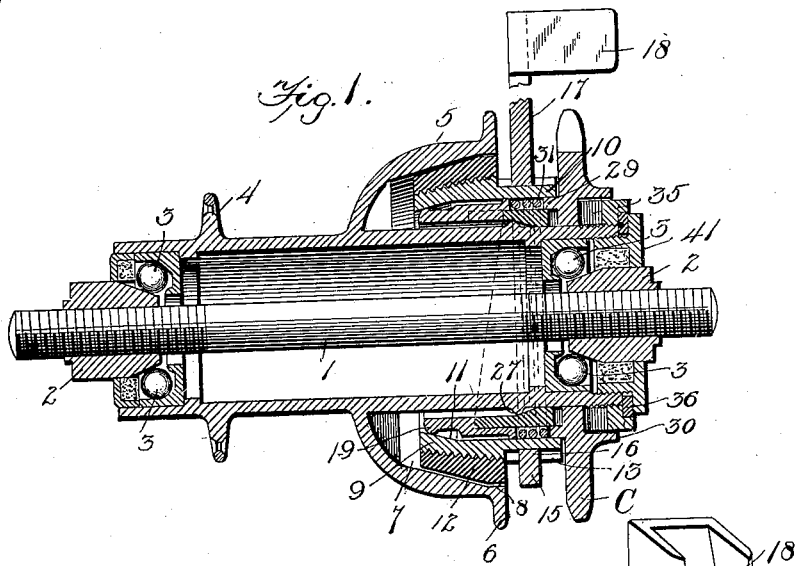
Figure 2:
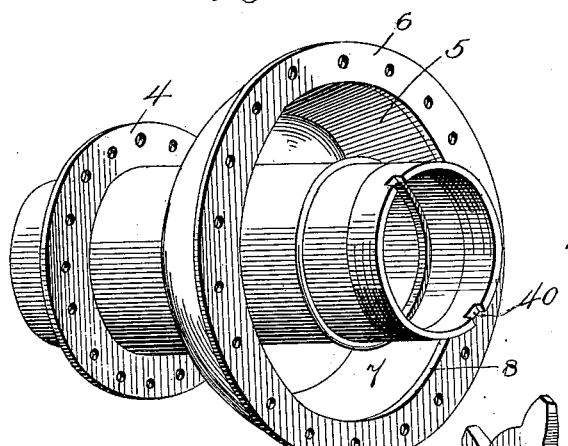
Figure 3:
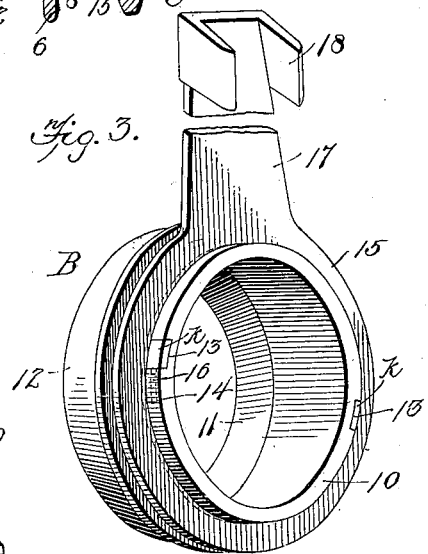
Figure 4:
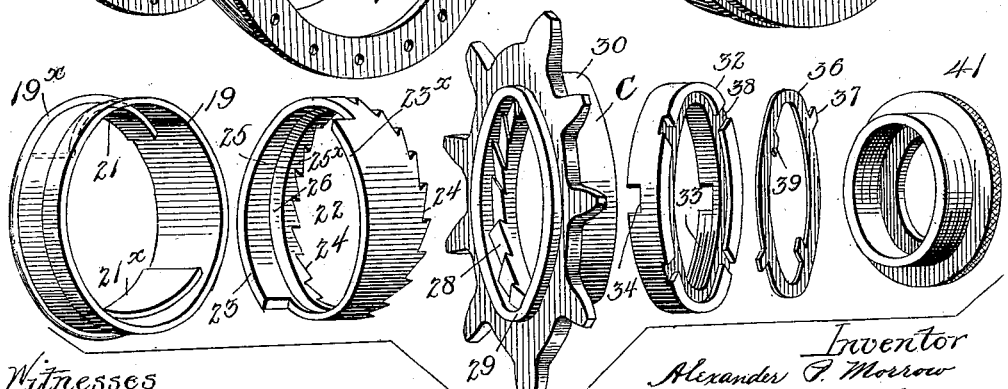

Figure 1 is a central vertical longitudinal section of a hub embodying my improved construction and to which my improved combined coasting and brake mechanism is applied. Fig. 2 is a perspective of the hub with the mechanism removed therefrom. Fig. 3 is a perspective of the brake-shoe and the bracket or ring which locks it against rotation. Fig. 4 is a detail view showing the brake-ring, the clutch-ring, the sprocket-wheel, the antifriction-roller ring, locking-ring, and locking-nut arranged in adjacent sequence of assemblage.

Referring to the drawings, A designates the hub of the rear wheel of a bicycle, consisting of a cylinder of proper length and diameter supported on an axle 1, provided with conical bearing-sleeves 2 2 and revolving thereon by ball-bearings 3 3, held in place by the usual means, and all being of any suitable construction and arrangement, substantially as shown. Adjacent to one end of the hub is a spoke-flange 4, adapted to have secured thereto the lower ends of one set of the wheel-spokes. At a proper point on the hub is formed an annular dish or cup-shaped flange 5, which overhangs the hub, and the mouth of which opens toward the brake end of the hub and the rim of which is formed with a vertical annular spoke-flange 6, to which the other series of spokes may be secured in any suitable manner. The inner face or surface, as 7, of this brake-flange 5 is preferably flaringly inclined for the greater portion of its depth and then at the mouth is straight and parallel with the axis of the hub, as at 8.

B designates the brake-shoe, consisting of a metal sleeve or cylinder 9, formed with a cylindrical extension or flange 10 and preferably an inclined or tapering portion 11, provided with exterior screw-threads, as indicated, and on the threaded portion is screwed the frictional shoe 12, made of any suitable material and having a superficial exterior formed and tapered coincident with the interior of the brake-flange 5, as shown in the drawings. In the extension or flange 10 are formed transversely-disposed ways or grooves 13 13, diametrically opposite from which lead open-end slots 14, (see dotted lines, Fig. 3,) and on this portion of the brake-shoe is fitted and held a holding-ring 15, formed with radial interior lugs 16 16, adapted to slip into the ways 13 and then to engage in the slots 14. The ring 15 is formed with an arm 17, having laterally-turned flanges or plates 18 18$^\times$ at the end portion, which flanges set over one of the fork-bars of the frame and hold the ring against rotation, and the ring being thus locked to the frame and to the brake-shoe sleeve by means of the lugs of the ring and keys $k$ in the ways 13 the brake-shoe is held from rotation also.

Mounted loosely on the hub is a brake-ring 19, having an annular bead or rib 19$^\times$ at its inner end to engage the interior incline or bevel 11 of the brake-shoe sleeve, as indicated in Fig. 1 of the drawings. This brake-ring 19 has a limited longitudinal play or movement on the hub, so that it automatically releases itself from braking contact with the brake-shoe when the force is removed which caused such engagement. In the interior of the brake-ring are formed oppositely-arranged bearing-plates 21 21×, the outer ends of which constitute cam-surfaces, against which the inner extended cams of the clutch-ring engage to force the brake-ring longitudinally on the hub and into engagement with the brake-shoe sleeve.

22 designates the clutch-ring loosely mounted on the hub and formed with extended cams 23 23× on its inner edge, which engage against the opposing cam ends of the plates 21 21× on the inner face of the brake-ring. On the opposite and outer edge of the clutch-ring 22 are formed a series of inclines, cams, or ratchet-teeth 24 to engage with the opposing cams on the inner face of the sprocket-wheel, as hereinafter specified. The interior surface of the clutch-ring is formed with two parallel planes 25 25×, the former being of larger diameter than the latter and the two being united by an incline 26, which is adapted to ride on an annular bead or rib 27 on the hub, and thus lock the hub, the ring, and the sprocket-wheel together when the pedals are rotated in the forward movement to propel the machine.

C designates the sprocket-wheel loosely mounted on the hub, so that the hub may rotate independently thereof when coasting, and while the sprocket-wheel is held against rotation by stopping the pedals and holding them in fixed position by the non-movement of the chain. The inner face of the hub of the sprocket-wheel is formed with a series of face-inclines, cams, or ratchet-teeth 28, coincident to and engaging with the contiguous cams on the outer edge of the clutch-ring. These interengaging sets of cams of the sprocket-wheel and the clutch-ring do not ride past each other, but when engaged have a limited sliding movement on each other sufficient to lock and unlock the sprocket-wheel on its bearing, and so that when desired to brake the wheel the cams will aline and the clutch-ring and sprocket-wheel reverse together, thus bringing the cams on the inner face of the clutch-ring into engagement with the brake-ring and push that element into engagement with the brake-shoe and brake the machine.

On the inner face of the sprocket-wheel is formed a circular flange 29, extending longitudinally inward a proper distance over the circumferential face of the clutch-ring which it loosely surrounds, as indicated in the drawings in Fig. 1, and on the outer face of the sprocket-wheel is a circular flange 30, extending the proper distance over the exterior face of the ring which carries the antifriction-rollers, as hereinafter specified. Between the free or inner edge of the circular flange 29 and the outer end of the brake-ring is interposed a suitable expansive spiral spring 31, encircling the clutch-ring, and the force of which tends to keep the sprocket-wheel in continuous contact with the antifriction-rollers.

32 designates a collar formed with interior screw-threads 33, which engage with counter-threads on the end of the hub. The inner end of this ring is formed with a plurality of recesses 34, in which are vertically-disposed antifriction-rollers 35, which bear against the outer face of the sprocket-wheel, as indicated in the drawings, and thus relieve the friction when the hub is turning and the sprocket-wheel is held stationary.

To lock the collar 32 on the hub, a ring 36 is employed, which is formed with projecting ears or lugs 37, which engage and fit in corresponding recesses 38, made in the outer end of the collar, and in the interior edge of the ring 36 are formed ears or lugs 39, which engage in recesses 40 in the perimeter of the hub, and to hold the parts altogether in operative relation and aggroupment a clamping-nut 41 is screwed into the end of the hub, as indicated in the drawings.

To assemble the parts, the hub and axle are supplied with the requisite bearings and parts in a well-known manner. The brake-flange of the hub and the brake-ring carrying the brake-shoe are put in place, then the clutch-ring, then the spring, followed by the sprocket-wheel, then the antifriction-roller ring with the rollers therein, then the ring 36, and then the fastening-nut 41 is screwed home and the parts are in operative relation and position, and when so assembled, arranged, and secured the operation is as follows: During the usual forward movement of the vehicle the sprocket-wheel is locked to the hub by the stress of the chain, which tends to move the loosely-mounted sprocket-wheel in the direction of the power, the movement causing the cams of the sprocket-wheel and the clutch-ring to engage and ride on each other, causing the ring to move longitudinally and engage on the bead or rib 27 on the hub, and thus the hub, clutch-ring, brake-ring, and sprocket-wheel are held rigidly and securely in engagement. In this locking of the parts the clutch-ring engages the brake-ring to revolve it, but does not move said brake-ring laterally. When it is desired to move or throw the parts into coasting relation and position, the pedals are stopped and held in one position, thereby, through the medium of the chain, holding the sprocket-wheel stationary, which action immediately and automatically releases the engagement of the clutch-ring from the bead on the hub, and the hub, with the wheel, is free to rotate until the parts are again thrown into engagement by the forward rotation of the pedals. When it is desired or required to brake the wheel, all that is necessary is to "back-pedal," which brings the teeth of the engaging cams into alinement and effects a reversal in rotation of both the sprocket-wheel and the clutch-ring, the movement of the latter causing its cam-surfaces 23 and 23× to ride against the edges of the cams 21 and 21× of the brake-ring, thus pushing that element into engagement with the brake-shoe sleeve, which engages strongly with the inner surface of the brake-flange on the hub, and thus, it is readily perceived, the brake and the hub are held in strong frictional or braking contact, and so that the wheel will speedily be brought to a standstill or move forward with a gradually-decreasing speed, regulated according to the power expended on the pedals. The movement of the clutch-ring 22 away from the brake-ring 19 (caused by a renewal of forward-pedaling) withdraws the inclined surfaces 23 and 23× from contact with the edges of the cams 21 and 21×, thus permitting the brake-ring 19 to recede from braking contact with the surface 11 of the brake-shoe. While the spring 31 bears against the ring 19, said spring is not of sufficient strength or stiffness to move said ring into engagement with the surface 11.

By the use of my improved mechanism hereinbefore described the rider after alighting may readily push the machine backward by hand without applying the brake. To set the brake a positive pressure on the pedals is required, and hence, when no pressure is applied, the bicycle may be freely run backward by hand the brake not impeding such movement.

While I have shown and described a preferred construction of elements, I desire it to be understood that I claim all modified constructions not amounting to departures from the principles of operation herein suggested.

I make no claim in this application to the hub having a fixed overhanging radial brake-flange except as an element of the combination shown, for the reason that the hub as a separate and independent invention forms the subject-matter of another application for patent now pending filed by me under date of December 26, 1899, Serial No. 741,633.

Having thus described my invention, what I claim, and desire to secure by Letters Patent, is—

1. A hub-braking mechanism for bicycles and like vehicles, comprising the hub having a braking-surface thereon, a sprocket-wheel loosely mounted on the hub, a non-rotative but laterally-movable brake-shoe and means loosely mounted on the hub for forcing the brake-shoe against said braking-surface, comprising a brake-ring having internal cams; a clutch-ring having cams coöperating with those on the brake-ring; and the sprocket-wheel provided with means for coöperating with the clutch-ring, and means for locking the sprocket, brake-ring and clutch-ring to the hub during forward driving, and for releasing the hub upon a reversal of motion of the sprocket.

2. Brake mechanism for bicycles and like vehicles, comprising a hub formed with an annular flaring brake-flange; a non-rotative brake-shoe coöperating with the flange on the hub, and means for moving the brake-shoe laterally, comprising a brake-ring provided with internal cam-surfaces, a clutch-ring arranged within the brake-ring and having cams coöperating therewith, and a sprocket-wheel provided with means for coöperating with the clutch-ring, and means for locking the sprocket, brake-ring and clutch-ring to the hub during forward driving thereof, and for releasing it upon a reversal of the motion of the sprocket.

3. Brake mechanism for bicycles and like vehicles, comprising a hub provided with a flaring brake-flange and an annular bead or boss, a brake-shoe capable of longitudinal movement on the hub, but held against rotary motion, a brake-ring arranged within the shoe and formed with internal cam-surfaces, and an exterior annular bead or rib adapted to bear against the brake; a clutch-ring formed at one side with edge cams, and at its opposite side with ratchet-teeth and with an internal annular incline; a sprocket formed with ratchet-teeth coöperating with the teeth of the clutch-ring, and means for supporting the sprocket-wheel upon the hub.

4. A braking mechanism for bicycles and like vehicles, comprising the wheel-hub formed with an overhanging and flaring annular brake-flange, a brake-shoe capable of a lateral movement disposed within the flange and formed with an arm arranged to engage the frame of the machine and hold the brake-shoe against rotation, a brake-ring on the hub having internal cams; a clutch-ring having cams coöperating with the brake-ring cams; a sprocket-wheel having means for coöperating with the clutch-ring; and means for locking the brake-ring, clutch-ring and sprocket-wheel to the hub during forward driving, and for releasing the hub by back-pedaling.

5. A braking mechanism for bicycles and like vehicles, comprising the wheel-hub formed with an overhanging annular flange, a brake-shoe disposed within the flange and held against rotation but capable of lateral movement, a brake-ring on the hub to engage the brake-shoe and provided with internal cams, a loosely-mounted ring on the hub formed with cams to engage the brake-ring and move it laterally, a sprocket-wheel loosely mounted on the hub formed with means to turn the adjacent ring when reversed and devices coöperating with the loosely-mounted ring for forward driving, substantially as specified.

6. A braking mechanism for bicycles and like vehicles, comprising the hub formed with a brake-flange, a laterally-movable brake-shoe arranged within the brake-flange, an arm secured to the brake-shoe and to the frame of the machine to hold the brake-shoe against rotation, a brake-ring mounted on the hub and formed with internal cam-surfaces, a clutch-ring on the hub having cams to engage those on the brake-ring, and ratchets on its outer edge, a sprocket-wheel on the hub reversely rotatable thereon and provided with ratchet-teeth to engage with the ratchet-teeth on the said clutch-ring, mechanism for forward driving, and means for taking up the right-hand thrust, substantially as described.

7. The brake for bicycles and similar vehicles herein described, comprising a hub formed with a brake flange or surface, a laterally-movable annular brake-shoe tapered to fit within the brake-flange and held against rotation, a brake-ring loosely mounted on the hub and having a rotary movement and limited longitudinal movement thereon and formed with internal plates having cam-surfaces on their outer ends, a clutch-ring loosely mounted on the hub and formed with cam-surfaces to engage the cams on the brake-ring, means for locking the clutch-ring to the hub when rotated forward, ratchet-teeth on the outer end or edge of the clutch-ring, a sprocket-wheel mounted loosely on the hub and formed with ratchet-teeth on its inner face to engage the ratchet-teeth on the outer end of the clutch-ring, and a device to take up the outward thrust of the sprocket-wheel whereby when the sprocket-wheel is reversed the clutch-ring is rotated and its inner cam-surfaces brought into contact with the brake-ring, and the brake and clutch mechanism for forward driving applied.

8. Brake and coasting mechanism for bicycles, comprising a hub formed with an annular overhanging brake-flange and an annular bead; a laterally-movable but non-rotative brake-shoe within said brake-flange, a brake-ring within the brake-shoe provided with internal cam-surfaces; a clutch-ring formed with cam-surfaces coöperating with those on the brake-ring, with an internal incline to engage the bead on the hub, and on the outer end with ratchet-teeth; a sprocket-wheel formed with ratchet-teeth to engage those of the clutch-ring; and means for taking up the outward thrust of the sprocket-wheel.

9. The combination with a bicycle of combined coasting and brake mechanism applied to the rear hub, comprising an annular bead formed on the hub, a sprocket-wheel, means for locking said wheel and the hub for forward driving; means for releasing the sprocket when the movement of the pedals is stopped; and brake mechanism operated by back-pedaling, but not affected by the backward revolution of the rear wheel of the machine.

10. A bicycle brake mechanism, comprising a hub having a hollow body portion or sleeve; an annular flange projecting from the sleeve and overhanging the same laterally, a beveled projection or bead on said sleeve concentric with the flange; and laterally-movable brake mechanism coöperating with said flange and beveled projection.

11. A bicycle-hub, comprising a hollow body portion or sleeve, an annular flange projecting from the sleeve and overhanging the same laterally; and a beveled projection or bead on said sleeve concentric with the flange and adjacent to the end of the sleeve which is overhung by the flange, in combination with brake mechanism adapted to frictionally engage said flange, driving mechanism coöperating with the beveled projection or bead, and means for retaining the parts in their proper relative positions.

In testimony whereof I affix my signature in presence of two witnesses.

ALEXANDER P. MORROW.

Witnesses:
OLIVER P. HIPPLE,
M. L. BANKS.